(12) United States Patent
Connors et al.

(10) Patent No.: US 9,439,344 B2
(45) Date of Patent: Sep. 13, 2016

(54) MIRRORED INDUCTOR SEGMENT PAIRS OF AN INDUCTOR BOX OF AN AGRICULTURAL IMPLEMENT

(71) Applicant: CNH Canada, Ltd., Saskatoon (CA)

(72) Inventors: Michael J. Connors, Lockport, IL (US); David D. Flamme, Winfield, IL (US); Chad M. Johnson, Arlington Heights, IL (US); Scott A. Long, Plainfield, IL (US); Grant T. MacDonald, Ames, IA (US); Marvin A. Prickel, Homer Glen, IL (US); Martin J. Roberge, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 369 days.

(21) Appl. No.: 13/737,757

(22) Filed: Jan. 9, 2013

(65) Prior Publication Data

US 2014/0193211 A1    Jul. 10, 2014

(51) Int. Cl.
*B65G 53/04* (2006.01)
*A01C 7/08* (2006.01)

(52) U.S. Cl.
CPC ..................................... *A01C 7/081* (2013.01)

(58) Field of Classification Search
USPC ................ 406/94, 95, 117, 118, 119, 120; 111/174, 175, 176; 56/13.3, 13.4
See application file for complete search history.

(56) References Cited

U.S. PATENT DOCUMENTS

| | | | |
|---|---|---|---|
| 1,053,412 A * | 2/1913 | Lob | 406/95 |
| 2,764,111 A * | 9/1956 | Collins | 111/70 |
| 2,861,527 A * | 11/1958 | Phillips | 111/186 |
| 2,874,999 A * | 2/1959 | Lofgren | 406/95 |
| 3,073,265 A * | 1/1963 | Movilla et al. | 111/109 |
| 3,490,654 A * | 1/1970 | Fischer | 406/123 |
| 3,633,522 A * | 1/1972 | Main | 111/69 |
| 4,060,181 A * | 11/1977 | Grataloup | 406/93 |
| 4,106,414 A | 8/1978 | Vastag | |
| 4,246,469 A * | 1/1981 | Merlo | 377/6 |
| 4,257,534 A * | 3/1981 | Williams | 222/1 |
| 4,280,419 A * | 7/1981 | Fischer | 111/174 |
| 4,453,866 A | 6/1984 | Ryan | |
| 4,669,922 A * | 6/1987 | Hooper et al. | 406/157 |
| 4,718,574 A * | 1/1988 | Schoenmaekers | 221/203 |
| 4,758,119 A * | 7/1988 | Frase et al. | 406/109 |
| 4,779,765 A * | 10/1988 | Neumeyer | 222/142 |
| 5,120,275 A * | 6/1992 | Zacharias | 460/111 |
| 5,133,270 A * | 7/1992 | Ledermann et al. | 111/130 |
| 5,161,473 A * | 11/1992 | Landphair et al. | 111/176 |
| 5,379,706 A | 1/1995 | Gage et al. | |
| 5,392,722 A * | 2/1995 | Snipes et al. | 111/174 |
| 5,402,741 A * | 4/1995 | Truax et al. | 111/172 |

(Continued)

*Primary Examiner* — Jospeh Dillon, Jr.

(74) *Attorney, Agent, or Firm* — Rebecca L. Henkel (57) ABSTRACT

An agricultural product delivery system for an agricultural implement includes an inductor box with an agricultural product inlet configured to receive an agricultural product, an air inlet configured to receive an airflow, a plurality of mixing chambers, and a plurality of air bypass channels. Each mixing chamber is configured to mix the agricultural product and a respective first portion of the airflow. The plurality of air bypass channels is configured to guide a respective second portion of the airflow from the air inlet to a respective mixing chamber of the plurality of mixing chambers. The plurality of bypass channels includes inside air bypass channels that contact adjacent inside air bypass channels, and outside air bypass channels that are arranged adjacent to an exterior inductor box wall.

18 Claims, 7 Drawing Sheets

(56) References Cited

U.S. PATENT DOCUMENTS

| | | | |
|---|---|---|---|
| 5,826,523 A | 10/1998 | Gregor | |
| 5,931,105 A * | 8/1999 | Luxon | 111/170 |
| 5,939,356 A * | 8/1999 | Wellinghoff | 504/100 |
| 5,947,040 A * | 9/1999 | Gregor | 111/174 |
| 5,979,343 A * | 11/1999 | Gregor et al. | 111/175 |
| 5,996,516 A * | 12/1999 | Benneweis et al. | 111/176 |
| 6,047,652 A * | 4/2000 | Prairie et al. | 111/174 |
| 6,089,478 A * | 7/2000 | Truan et al. | 239/675 |
| 6,148,748 A * | 11/2000 | Bardi et al. | 111/174 |
| 6,164,222 A | 12/2000 | Mayerle et al. | |
| 6,192,813 B1 * | 2/2001 | Memory et al. | 111/176 |
| 6,213,690 B1 * | 4/2001 | Gregor et al. | 406/123 |
| 6,253,693 B1 * | 7/2001 | Mayerle et al. | 111/174 |
| 6,267,067 B1 * | 7/2001 | Mayerle et al. | 111/170 |
| 6,273,648 B1 * | 8/2001 | Poncelet et al. | 406/181 |
| 6,289,830 B2 * | 9/2001 | Mayerle et al. | 111/174 |
| 6,290,433 B2 * | 9/2001 | Poncelet et al. | 406/181 |
| 6,298,797 B1 * | 10/2001 | Mayerle et al. | 111/175 |
| 6,564,730 B2 * | 5/2003 | Crabb et al. | 111/185 |
| 6,595,148 B2 * | 7/2003 | Meyer et al. | 111/63 |
| 6,609,468 B1 | 8/2003 | Meyer et al. | |
| 6,644,225 B2 * | 11/2003 | Keaton | 111/175 |
| 6,666,156 B1 * | 12/2003 | Mayerle et al. | 111/150 |
| 6,668,738 B2 * | 12/2003 | Lee et al. | 111/175 |
| 6,675,728 B2 * | 1/2004 | Lee et al. | 111/63 |
| 6,688,244 B1 * | 2/2004 | Meyer et al. | 111/174 |
| 6,725,788 B2 * | 4/2004 | McCartney et al. | 111/175 |
| 6,776,108 B2 * | 8/2004 | Crabb et al. | 111/185 |
| 6,883,445 B2 * | 4/2005 | Mayerle | 111/175 |
| 6,928,941 B1 * | 8/2005 | Sternitzke | 111/181 |
| 7,025,010 B2 * | 4/2006 | Martin et al. | 111/122 |
| 7,093,547 B2 * | 8/2006 | Mayerle | 111/174 |
| 7,182,029 B2 * | 2/2007 | Johnson et al. | 111/175 |
| 7,213,525 B2 * | 5/2007 | Meyer et al. | 111/174 |
| 7,264,423 B2 * | 9/2007 | Kowalchuk | 406/181 |
| 7,267,061 B2 * | 9/2007 | Mayerle | 111/174 |
| 7,334,532 B2 * | 2/2008 | Sauder et al. | 111/185 |
| 7,353,760 B2 * | 4/2008 | Mayerle et al. | 111/175 |
| 7,413,387 B2 * | 8/2008 | Pleyer | 406/41 |
| 7,413,388 B2 * | 8/2008 | Krebs | 406/55 |
| 7,462,002 B2 * | 12/2008 | Mayerle | 406/120 |
| 7,640,877 B1 * | 1/2010 | Memory | 111/174 |
| 7,669,538 B2 * | 3/2010 | Memory et al. | 111/174 |
| 7,752,984 B2 * | 7/2010 | Memory | 111/176 |
| 7,779,769 B2 * | 8/2010 | Memory | 111/174 |
| 7,779,770 B2 * | 8/2010 | Sauder et al. | 111/185 |
| 7,806,061 B2 * | 10/2010 | Memory | 111/123 |
| 7,866,269 B2 * | 1/2011 | Naylor et al. | 111/174 |
| 8,033,230 B2 * | 10/2011 | Naylor et al. | 111/176 |
| 8,079,317 B2 * | 12/2011 | Anderson et al. | 111/175 |
| 8,234,987 B2 | 8/2012 | Georgison et al. | |
| 8,448,585 B2 * | 5/2013 | Wilhelmi et al. | 111/175 |
| 2001/0013309 A1 | 8/2001 | Mayerle et al. | |
| 2004/0163578 A1 | 8/2004 | McDonald et al. | |
| 2004/0206283 A1 * | 10/2004 | Mayerle | 111/130 |
| 2008/0018970 A1 * | 1/2008 | Miyanagi et al. | 359/197 |
| 2008/0105445 A1 * | 5/2008 | Dayton et al. | 172/105 |
| 2008/0295751 A1 | 12/2008 | Shoup et al. | |
| 2010/0017073 A1 * | 1/2010 | Landphair | 701/50 |
| 2010/0037807 A1 * | 2/2010 | Henning et al. | 111/84 |
| 2010/0326339 A1 * | 12/2010 | Georgison et al. | 111/175 |
| 2011/0162566 A1 * | 7/2011 | Wilhelmi et al. | 111/200 |
| 2011/0282556 A1 * | 11/2011 | Klenz et al. | 701/50 |
| 2012/0042815 A1 * | 2/2012 | Wonderlich | 111/174 |
| 2012/0174843 A1 * | 7/2012 | Friggstad | 111/174 |
| 2012/0174844 A1 * | 7/2012 | Friggstad | 111/175 |
| 2012/0272881 A1 * | 11/2012 | Georgison et al. | 111/175 |
| 2014/0190378 A1 * | 7/2014 | Johnson et al. | 111/174 |
| 2014/0190379 A1 * | 7/2014 | Johnson et al. | 111/174 |
| 2014/0190380 A1 * | 7/2014 | MacDonald et al. | 111/174 |
| 2014/0193212 A1 * | 7/2014 | Johnson et al. | 406/122 |
| 2014/0193213 A1 * | 7/2014 | Johnson et al. | 406/122 |
| 2014/0193214 A1 * | 7/2014 | Johnson et al. | 406/122 |
| 2014/0193215 A1 * | 7/2014 | Connors et al. | 406/136 |
| 2014/0261116 A1 * | 9/2014 | Redman et al. | 111/174 |

* cited by examiner

MIRRORED INDUCTOR SEGMENT PAIRS OF AN INDUCTOR BOX OF AN AGRICULTURAL IMPLEMENT

BACKGROUND

The invention relates generally to ground working equipment, such as agricultural equipment, and more specifically, to delivering agricultural product through mirrored inductor segments of an inductor box of an agricultural implement.

Generally, planting implements (e.g., planters) are towed behind a tractor or other work vehicle via a mounting bracket secured to a rigid frame of the implement. These planting implements typically include multiple row units distributed across the width of the implement. Each row unit is configured to deposit seeds at a desired depth beneath the soil surface, thereby establishing rows of planted seeds. For example, each row unit may include a ground engaging tool or opener (e.g., an opener disc) that forms a seeding path for seed deposition into the soil. In certain configurations, a gauge wheel is positioned a vertical distance above the opener to establish a desired trench depth for seed deposition into the soil. As the implement travels across a field, the opener excavates a trench into the soil, and seeds are deposited into the trench. In certain row units, the opener is followed by a packer wheel that packs the soil on top of the deposited seeds.

Certain planting implements include a remote seed tank, and a pneumatic distribution system configured to convey seeds from the tank to each row unit. For example, the pneumatic distribution system may include an inductor box positioned beneath the seed tank. The inductor box is configured to receive seeds from the tank, to fluidize the seeds into an air/seed mixture, and to distribute the air/seed mixture to the row units via a network of pneumatic hoses/conduits. Each row unit, in turn, receives the seeds from the pneumatic hoses/conduits, and directs the seeds to a metering system. The metering system is configured to provide a flow of seeds to a seed tube for deposition into the soil. By operating the metering system at a particular speed, a desired seed spacing may be established as the implement traverses a field.

An agricultural product inlet of the inductor box receives the seeds from the tank into a seed supply chamber. Airflow through the seed supply chamber guides the seeds to the network of pneumatic hoses/conduits. Unfortunately, structures between the inlet and the seed supply chamber may reduce the flow of seeds to the row units. Furthermore, narrow gaps between the structures may become clogged with clusters of seed or debris, thereby interfering with operations of the pneumatic distribution system.

BRIEF DESCRIPTION

In one embodiment, an agricultural product delivery system for an agricultural implement includes an inductor box with an agricultural product inlet configured to receive an agricultural product, an air inlet configured to receive an airflow, a plurality of mixing chambers, and a plurality of air bypass channels. Each mixing chamber is configured to mix the agricultural product and a respective first portion of the airflow. The plurality of air bypass channels is configured to guide a respective second portion of the airflow from the air inlet to a respective mixing chamber of the plurality of mixing chambers. The plurality of bypass channels includes inside air bypass channels that contact adjacent inside air bypass channels, and outside air bypass channels that are arranged adjacent to an exterior inductor box wall.

In another embodiment, an agricultural product delivery system for an agricultural implement includes an inductor box with an agricultural product inlet configured to receive agricultural product, an air supply chamber configured to receive an airflow for conveying the agricultural product through the inductor box, a first inductor segment, and a second inductor segment. The first inductor segment includes a first air bypass channel configured to guide a first portion of the airflow from the air supply chamber through the agricultural product inlet. The first air bypass channel includes a first channel wall. The second inductor segment is adjacent to the first inductor segment and includes a second air bypass channel. The second air bypass channel includes a second channel wall and is configured to guide a second portion of the airflow from the air supply chamber through the agricultural product inlet. The second channel wall contacts the first channel wall.

In a further embodiment, an agricultural product delivery system for an agricultural implement includes an inductor box with an air supply chamber configured to receive an airflow, and a first inductor segment pair arranged within the inductor box and configured to receive a portion of the airflow. The first inductor segment pair includes a first inductor segment with a first mixing chamber and a first air bypass channel coupled to the first mixing chamber and to the air supply chamber. The first inductor segment pair includes a second inductor segment with a second mixing chamber and a second air bypass channel coupled to the second mixing chamber and to the air supply chamber. The second inductor segment is a mirror image of the first inductor segment relative to a first interface between the first inductor segment and the second inductor segment. The first inductor segment pair includes a gap between the first air bypass channel and the second air bypass channel across the first interface. The gap is configured to receive agricultural product for distribution to the first mixing chamber and to the second mixing chamber.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Figure 1:
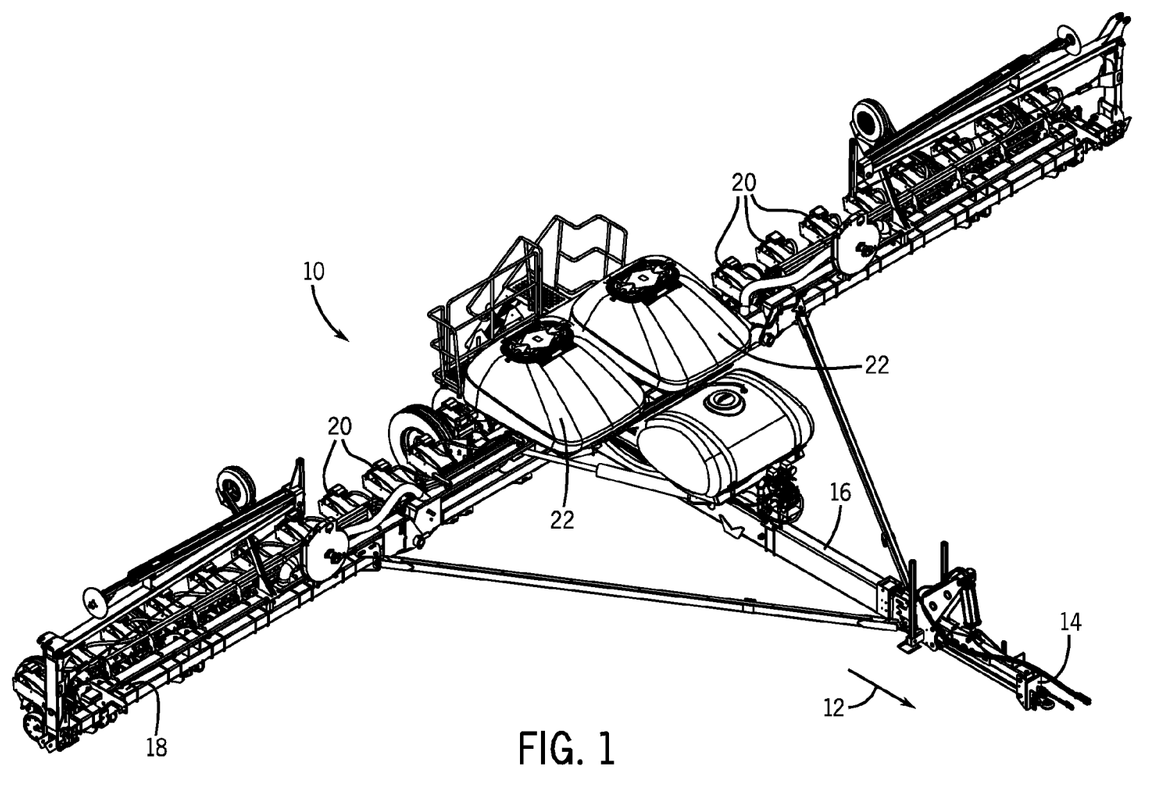
FIG. 1 is a perspective view of an embodiment of an agricultural implement configured to deposit seeds into a soil surface.

FIG. 1 is a perspective view of an embodiment of an agricultural implement 10 configured to deposit seeds into a soil surface. In the illustrated embodiment, the implement 10 is configured to be towed along a direction of travel 12 by a work vehicle, such as a tractor or other prime mover. The work vehicle may be coupled to the implement 10 by a hitch assembly 14. In some embodiments, the implement 10 may be mounted directly on the work vehicle. As illustrated, the hitch assembly 14 is coupled to a main frame assembly 16 of the implement 10 to facilitate towing of the implement 10 in the direction of travel 12. In the illustrated embodiment, the frame assembly 16 is coupled to a tool bar 18 that supports multiple row units 20. Each row unit 20 is configured to deposit seeds at a desired depth beneath the soil surface, thereby establishing rows of planted seeds. The implement 10 also includes seed tanks 22, and a pneumatic distribution system configured to convey seeds from the tanks to the row units 20. In certain embodiments, the pneumatic distribution system includes an inductor box positioned beneath each seed tank 22. Each inductor box is configured to receive seeds from a respective tank, to fluidize the seeds into an air/seed mixture, and to distribute the air/seed mixture to the row units 20 via a network of pneumatic hoses/conduits.

In certain embodiments, each row unit 20 includes a residue manager, an opening assembly, a seed tube, closing discs, and a press wheel. The residue manager includes a rotating wheel having multiple tillage points or fingers that break up crop residue, thereby preparing the soil for seed deposition. The opening assembly includes a gauge wheel and an opener disc. The gauge wheel may be positioned a vertical distance above the opener disc to establish a desired trench depth for seed deposition into the soil. As the row unit travels across a field, the opener disc excavates a trench into the soil for seed deposition. The seed tube, which may be positioned behind the opening assembly, directs a seed from a metering system into the excavated trench. The closing discs then direct the excavated soil into the trench to cover the planted seed. Finally, the press wheel packs the soil on top of the seed with a desired pressure.

While the illustrated implement 10 includes 24 row units 20, it should be appreciated that alternative implements may include more or fewer row units 20. For example, certain implements 10 may include 6, 8, 12, 16, 24, 32, or 36 row units, or more. In addition, the spacing between row units may be particularly selected based on the type of crop being planting. For example, the row units may be spaced 30 inches from one another for planting corn, and 15 inches from one another for planting soybeans.

Various embodiments of the present disclosure include an inductor box for a planting implement. The inductor box receives agricultural product (e.g., seed, fertilizer, etc.) from a tank, and an airflow to distribute the agricultural product through a network of pneumatic hoses/conduits. The agricultural product flows through an agricultural product inlet to a seed bed of the inductor box. Some portions of the airflow are directed through and/or over the seed bed to bring the agricultural product to a mixing chamber for mixing and distribution. Other portions of the airflow are guided through inlet air bypass channels so that the whole airflow does not flow through the seed bed. The air bypass channels enable the airflow to be efficiently utilized to supply sufficient quantities of agricultural product to the network of pneumatic hoses/conduits. The agricultural product within the inlet flows around the air bypass channels through gaps to the seed bed. Arranging each air bypass channel near (e.g. in contact with) another air bypass channel enables the gaps to be larger. Larger gaps may reduce the possibility that agricultural product clusters or debris may block portions of the gaps. In some embodiments, the air bypass channels are mirrored about a shared interface to increase the width of the gaps. Mirrored air bypass channels and other components of the inductor box may be arranged within the inductor box for efficient assembly and/or maintenance. For example, mirrored segments may have shared interfaces, thereby reducing the quantity of parts and the duration associated with assembly of the inductor box.

Figure 2:
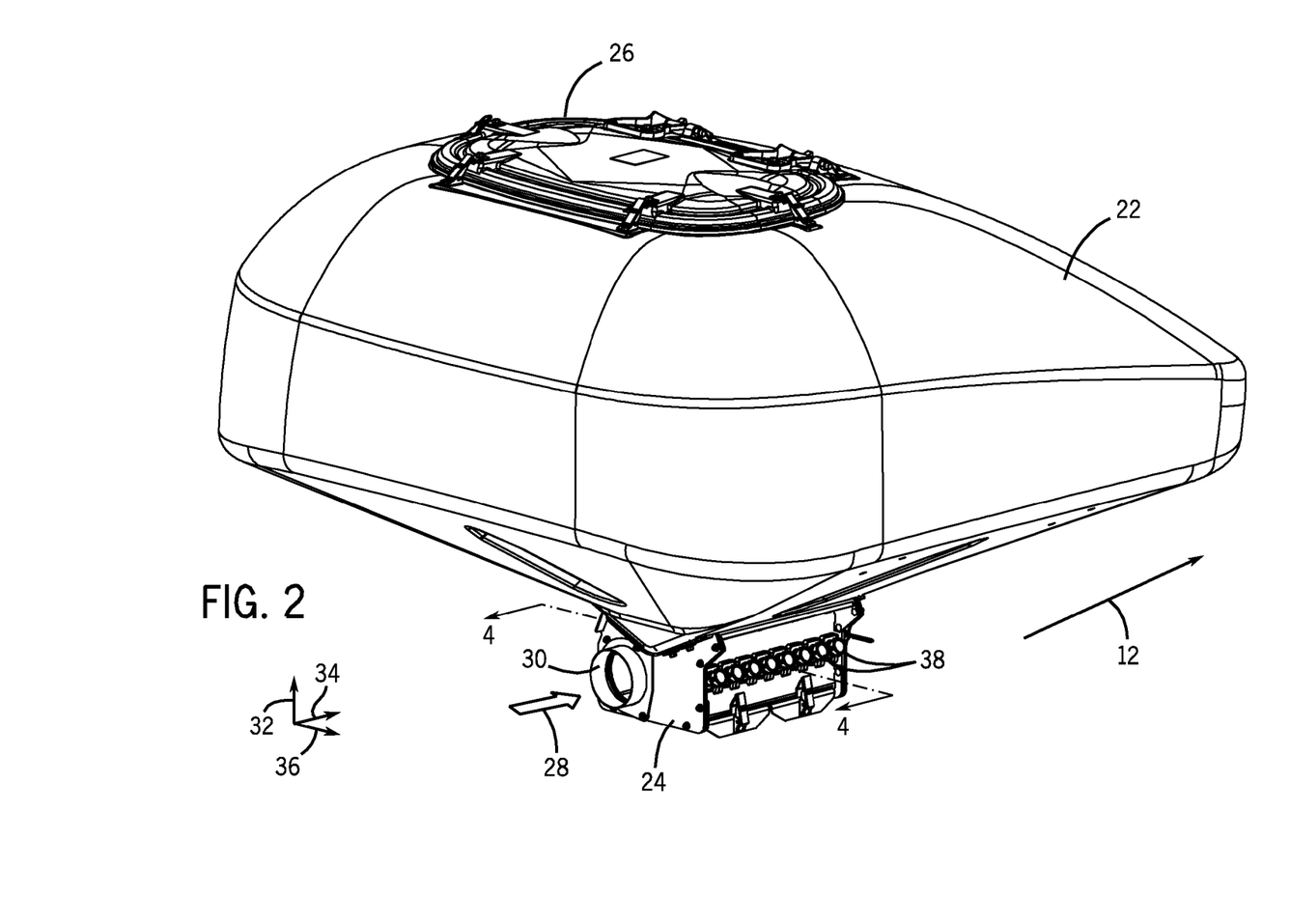
FIG. 2 is a perspective view of an embodiment of a tank and an inductor box of the agricultural implement of FIG. 1.

FIG. 2 is a perspective view of the seed tank 22 and an inductor box 24 of the agricultural implement 10 of FIG. 1. Agricultural product, such as seed, fertilizer, pesticide, fungicide, and so forth, may be added to the seed tank 22 through a hatch 26. The pneumatic distribution system supplies an airflow 28 to the inductor box 24 via an air inlet 30. The airflow 28 pressurizes the seed tank 22 to improve the flow of the agricultural product into the inductor box 24. The inductor box 24 is positioned below the seed tank 22 along a vertical axis 32, enabling gravity to facilitate the flow of the agricultural product into the inductor box 24. The vertical axis 32 (e.g., Y-axis) is substantially perpendicular to the ground. An X-axis 34, as described herein, is substantially parallel to the direction of travel 12 and to the ground. A Z-axis 36, as described herein, is perpendicular to the direction of travel 12 and parallel to the ground. As illustrated, the airflow 28 enters the inductor box 24 along the X-axis 34. Within the inductor box 24, the airflow 28 fluidizes the agricultural product into a mixture that is distributed via delivery ports 38 arranged substantially along the Z-axis 36. Presently contemplated embodiments may position the inductor box 24 at other positions and/or orientations relative to the seed tank 22 based on the configuration of the agricultural implement 10 and/or the desired implement application. Accordingly, the axes 32, 34, and 36 are utilized to describe directions relative to the inductor box 24.

The agricultural implement 10 may have multiple seed tanks 22 connected to multiple inductor boxes 24. Accordingly, the illustrated embodiment of FIG. 2 with eight delivery ports 38 may be a part of an agricultural product delivery system for an agricultural implement 10 with eight row units 20, or an agricultural product delivery system for an agricultural implement 10 with sixteen row units 20. Presently contemplated embodiments are not limited to inductor boxes 24 with eight delivery ports 38. For example, the inductor box 24 may have approximately 4, 6, 8, 10, 12, 14, 16, 18, 20, or more delivery ports 38 to distribute a fluidized agricultural product mixture to the row units 20.

Air bypass channels described herein enable the inductor box 24 to efficiently utilize the airflow 28 to distribute the agricultural product. Interfacing air bypass channels of adjacent inductor segments enables gaps between the air bypass channels to be larger, thereby enabling agricultural product to flow more freely to a seed bed at the bottom of the inductor box 24. Interfacing adjacent air bypass channels also reduce the quantity of structures extending through the flow of the agricultural product to the seed bed, as compared to non-interfacing adjacent air bypass channels. Adjacent inductor segments that are mirror images of one another may facilitate the assembly of the inductor box 24.

Figure 3:
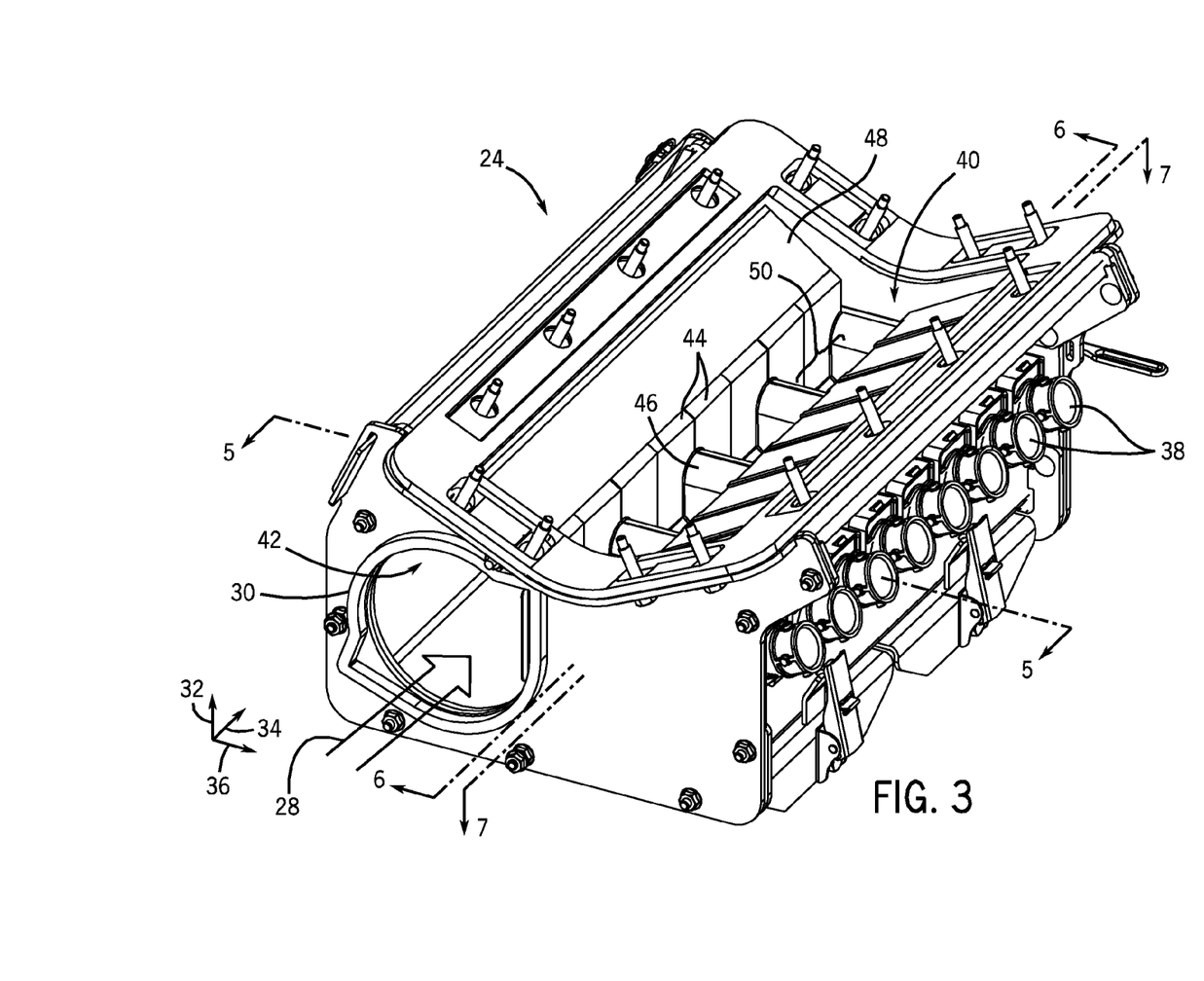
FIG. 3 is a perspective view of an embodiment of the inductor box of FIG. 2.

FIG. 3 is a perspective view of an embodiment of the inductor box 24 of FIG. 2. The agricultural product from the seed tank 22 enters the inductor box 24 through an agricultural product inlet 40. The air inlet 30 receives the airflow 28 into an air supply chamber 42. Inductor segments 44 are positioned between the air supply chamber 42 and the delivery conduits to supply a portion of the airflow 28 to the delivery conduits via air bypass channels 46. A portion of the airflow 28 flows through a seed screen below air bypass channels 46, or between the agricultural product inlet 40 and the air supply chamber 42 through an upper screen 48. Agricultural product flows through gaps 50 between air bypass channels 46 to a seed bed.

Figure 4:
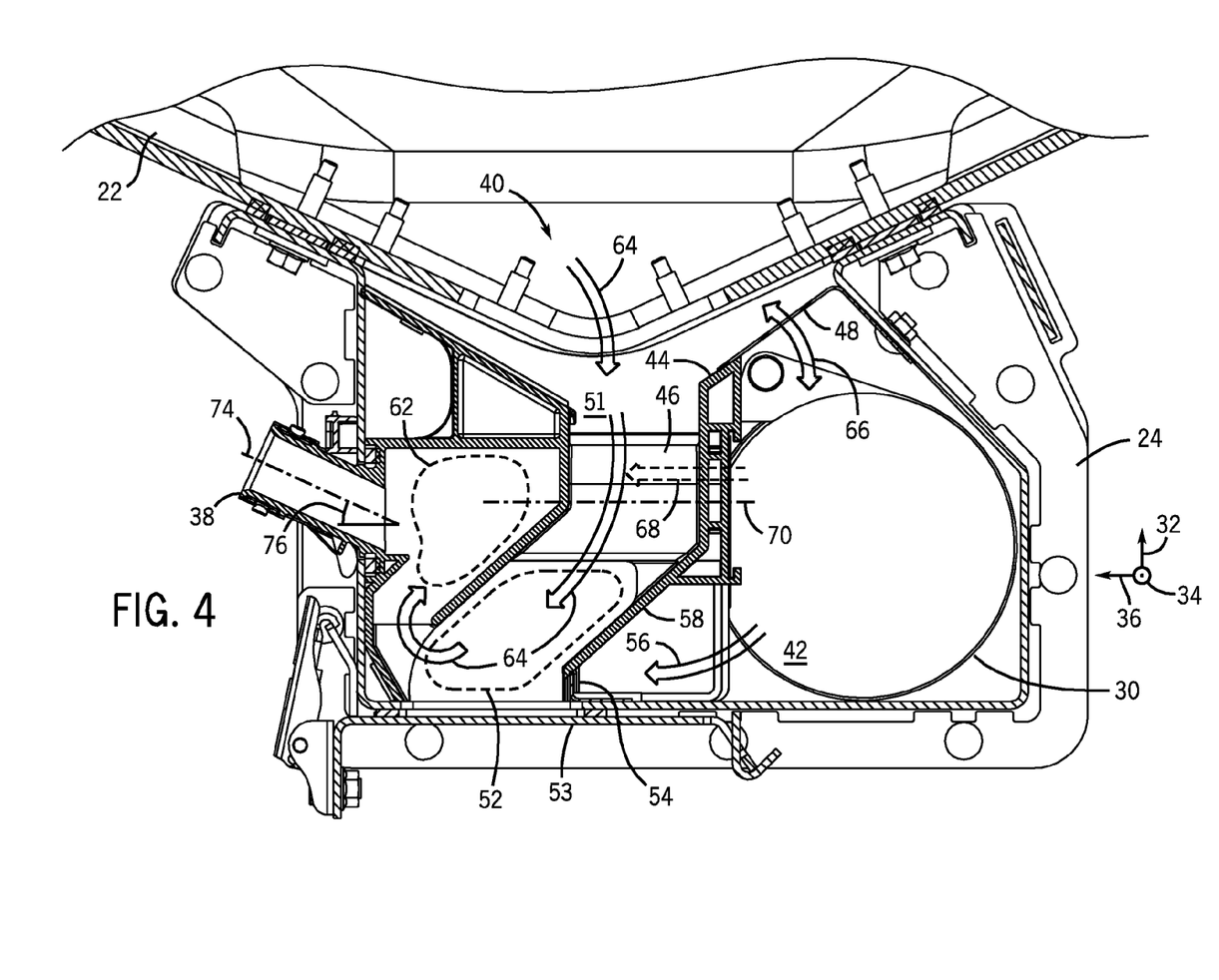
FIG. 4 is a cross-sectional view of an embodiment of the tank and the inductor box of FIG. 2, taken along line 4-4.

FIG. 4 is a cross-sectional view of an embodiment of the inductor box 24 and the seed tank 22 shown in FIG. 2, taken along line 4-4 through an inductor segment 44. The agricultural product from the seed tank 22 is received through the agricultural product inlet 40 into an agricultural product supply chamber 51 between the air supply chamber 42 and the delivery port 38. The agricultural product may collect in a seed bed 52 at a bottom 53 of the inductor box 24. A seed screen 54 enables a mixing airflow 56 from the airflow 28 to pass through the seed bed 52. A body 58 of the inductor segment 44 above the seed screen 54 guides the agricultural product from the agricultural product inlet 40, through the agricultural product supply chamber 51, and to the seed bed 52. The mixing airflow 56 from the air supply chamber 42 flows over and/or through agricultural product in the seed bed 52 to bring agricultural product to a mixing chamber 62. Accordingly, an agricultural product flowpath 64 extends from the seed tank 22 to the mixing chamber 62.

In some embodiments, a tank airflow 66 may pass through the upper screen 48 between the air supply chamber 42 and the seed tank 22. Accordingly, the seed tank 22 may be pressurized by the air supply chamber 42. In other embodiments, the seed tank 22 is pressurized separately from the air supply chamber 42, and the air supply chamber 42 may receive the tank airflow 66 from the seed tank 22.

The mixing airflow 56, agricultural product, and a bypass airflow 68 mix within the mixing chamber 62 to provide a desirable ratio of air to agricultural product for delivery to the row units 20. A backpressure from the row units 20 in fluid connection with the mixing chamber 62 through the delivery port 38 may control the quantity of the agricultural product delivered through the delivery port 38. The bypass airflow 68 from the air bypass channel 46 to the mixing chamber 58 may control the amount of the agricultural product delivered through the delivery port 38. For example, the bypass airflow 68 may supply sufficient air pressure and air volume to mix in the mixing chamber 62 to facilitate conveyance of the agricultural product as a fluidized mixture through the delivery port 38. In some embodiments, the bypass airflow 68 through the air bypass channels 46 may be between approximately 50 to 75 percent of the airflow 28. The quantity of the mixing flow 56 through and/or over the seed bed 52 may be controlled to be sufficient to carry seed to the mixing chamber 62 for each inductor segment 44. For example, the mixing flow 56 may be less than approximately 50 percent of the airflow 28.

The bypass air channels 46 of the inductor segments 44 may improve the efficiency of the inductor box 24 by enabling the bypass airflow 68 to pass directly to the mixing chambers 62 from the air supply chamber 42 without losing pressure (e.g., energy) by flowing through the seed bed 52. Thus, the bypass air flow 68 bypasses the seed bed 52. The bypass channels 46 enable the bypass airflow 68 to mix with agricultural product in the mixing chamber 62 without substantially disturbing the flow of the agricultural product through the agricultural product supply chamber 51 to the seed bed 52. Rather than directing the entire airflow 28 through the seed bed 52 and losing pressure (e.g., energy) by lifting excess agricultural product to the mixing chamber 62 or by lifting agricultural product within the agricultural product supply chamber 51, the bypass air channels 46 enable the mixing flows 56 and bypass airflows 68 to be appropriately sized. For example, the airflow 28 may be divided into mixing flows 56 (e.g., 25 to 50 percent of airflow 28) sufficient to carry a desired quantity of agricultural product to the mixing chamber 62, and into bypass airflows 68 (e.g., 50 to 75 percent of airflow 28) sufficient to mix the agricultural product in the mixing chamber 62 and to distribute the mixture through the delivery ports 38.

In some embodiments, the air bypass channel 46 extends along a bypass axis 70. The bypass axis 70 may be substantially parallel to the Z-axis 36. In some embodiments, the bypass axis 70 may be at an angle below the Z-axis (e.g., towards the ground) to reduce agricultural product backflushing through the air bypass channel 46 when the air supply is shut off. The agricultural product flows along the vertical axis 32 through the agricultural product supply chamber 51 and to the seed bed 52 at the bottom 53 of the inductor box 24. Each delivery port 38 extends from the inductor box 24 along a delivery port axis 74. In some embodiments, the delivery port axis 74 is substantially collinear with the bypass axis 70 of the inductor segment 44. In some embodiments, the delivery port axis 74 is substantially parallel to the bypass axis 70, but laterally offset from and/or inclined relative to the bypass axis 70. For example, illustrated the delivery port axis 74 is inclined at an angle 76 of approximately 30 degrees relative to the bypass axis 70 and to the Z-axis 36. A delivery port axis 74 that is substantially parallel to the bypass axis 70 (i.e., both generally lie along the Z-axis) may reduce energy loss as the air flows from the air bypass channels 46 to the delivery ports 38.

Figure 5:
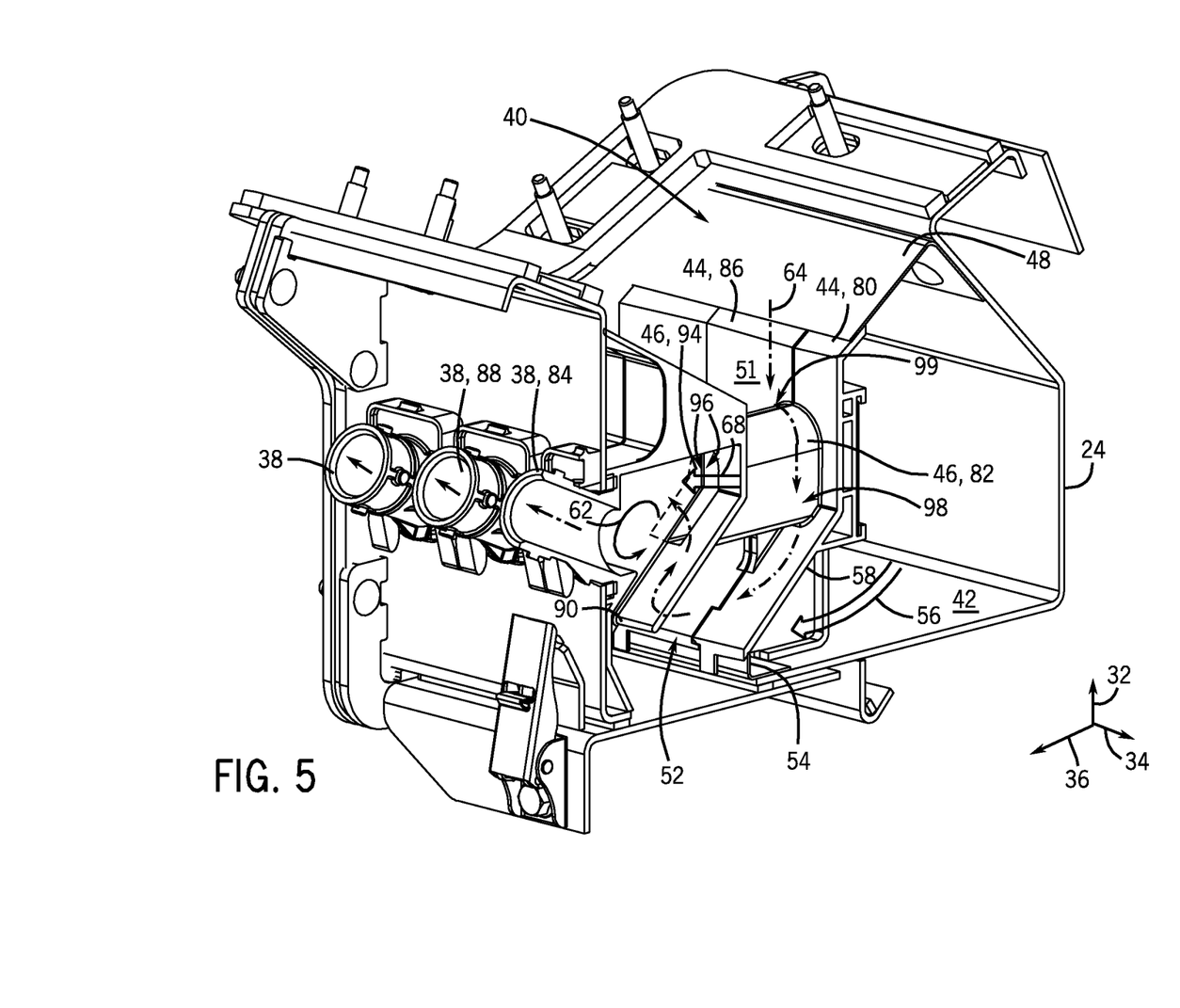
FIG. 5 is a cross-sectional view of an embodiment of the inductor box of FIG. 3, taken along line 5-5.

FIG. 5 is a cross-sectional view of the embodiment of the inductor box 24 of FIG. 3, taken along line 5-5. The agricultural product may flow through a first inductor segment 80 to a first delivery port 84 along the agricultural product flowpath 64. The agricultural product enters the first inductor segment 80 through the agricultural product inlet 40, and flows through the agricultural product supply chamber 51 around a first air bypass channel 82 to the seed bed 52. The first inductor segment 80 is positioned adjacent to a second inductor segment 86 that guides agricultural product to a second delivery port 88. The first air bypass channel 82 of the first inductor segment 80 contacts a second air bypass channel 94 of the second inductor segment 86. As used herein, the term "contacts" refers to components (e.g., inductor segments 44, air bypass channels 46) that abut one another and/or are within close proximity or tolerance to one another along a shared interface. For example, adjacent inductor segments 44 in contact with one another may be spaced a small tolerance (e.g., approximately 0.05 to 0.25 inches) apart from one another to enable multiple inductor segments 44 to be inserted in the inductor box 24. Contacting components substantially block agricultural product and/or airflow from passing through the shared interface between the contacting components.

The seed bed 52 is shared by the inductor segments 44. Furthermore, the mixing chambers 62 are separate from mixing chambers 62 of adjacent inductor segments 44. In some embodiments, mixing chambers 62 may be shared between two adjacent inductor segments 44.

The mixing chamber 62 of the first inductor segment 80 receives agricultural product and the mixing airflow 56 through an agricultural product passage 90 and a first bypass airflow 68 through the first air bypass channel 82. A first wall 96 of the first air bypass channel 82 contacts the second air bypass channel 94. A second wall 98 of the first air bypass channel 82 is exposed to the agricultural product flowing to the seed bed 52. The second wall 98 is substantially parallel to the agricultural product flowpath 64 through the agricultural product inlet 40. For example, the air bypass channels 46 may be relatively narrow along the X-axis 34, substantially perpendicular to the agricultural product flowpath 64, and relatively long along the Y-axis 32. The bypass airflow 68 flows in a direction (e.g., along the Z-axis 36) substantially perpendicular to the direction (e.g., along the Y-axis 32) that the agricultural product flows through the agricultural product supply chamber 51. The top 99 of the air bypass channel 46 may be curved to streamline the air bypass channels 46 for the agricultural product flowing to the seed bed 52.

Figure 6:
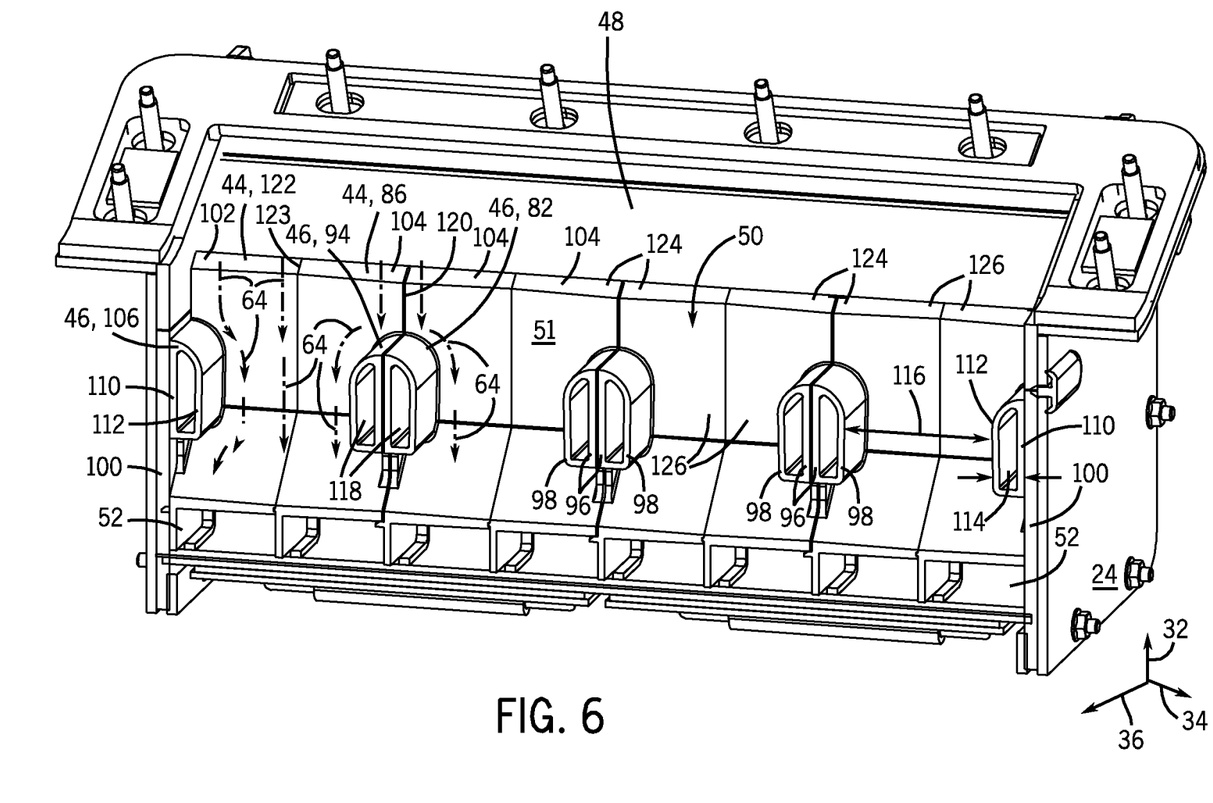
FIG. 6 is a cross-sectional view of an embodiment of the inductor box of FIG. 3, taken along line 6-6.

FIG. 6 is a cross-sectional view of an embodiment of the inductor box 24 of FIG. 3, taken along line 6-6 including pairs of inductor segments 44. The agricultural product flows through gaps 50 around the air bypass channels 46, as shown by the agricultural product flowpaths 64. The inductor box 24 may have multiple inductor segments 44 arranged between exterior inductor box walls 100. Outer inductor segments 102 are positioned adjacent to the inductor box walls 100, and inner inductor segments 104 are positioned between the outer inductor segments 102 in the interior of the inductor box 24. Outer walls 110 of the outside air bypass channels 106 may contact the exterior inductor box walls 100. Inner walls 112 of the outside air bypass channels 106 are spaced a channel-width 114 from the outer walls 110. The outer inductor segments 102 are positioned to space the inner walls 112 a gap-width 116 from the second wall 98 of an adjacent inner inductor segment 104 across the gaps 50.

Inside air bypass channels 118 of the inner inductor segments 104 share an interface with adjacent inside air bypass channels 118. For example, the first air bypass channel 82 contacts the adjacent second air bypass channel 94 along a first interface 120 between the first walls 96. In some embodiments, as illustrated, the first interface 120 is a plane substantially parallel to the vertical axis 32 and to the Z-axis 36. As may be appreciated, the first interface 120 may include mating interfaces with protrusions on the first inductor segment 80 corresponding to mating grooves on the second inductor segment 86, or vice versa. The second air bypass channel 94 may be a mirror image of the first air bypass channel 82 relative to the first interface 120. That is, the second air bypass channel 94 and the first air bypass channel 82 may have the same geometric shape. Presently contemplated geometries of the air bypass channels 46 include, but are not limited to, D-shape as shown, C-shape, or semicircular shapes.

Contacting air bypass channels 46 with similar geometries enable the gap-width 116 of the gaps 50 to be larger than if each air bypass channel was spaced apart from an adjacent air bypass channel. Large gap-widths 116 decrease the possibility of agricultural product or debris becoming lodged in the gap 50. Large gap-widths 116 with fewer obstructions, such as separated air bypass channels, may increase the flow of agricultural product to the seed bed 52. The delivery port 38 and/or the mixing chamber 62 of an inner inductor segment 44 may be a mirror image of the delivery port 38 and/or the mixing chamber 62 of the adjacent inductor segment 44. For example, the second delivery port 88 (See FIG. 5) may be a mirror image of the first delivery port 84 relative to the first interface 120.

In some embodiments, the geometry of substantially the whole inductor segment 44 is a mirror image of the adjacent inductor segment 44 relative to the interface shared with the adjacent inductor segment 44. That is, an inner inductor segment 104 (e.g., second inductor segment 86) may be a mirror image of another inner inductor segment 104 relative to a shared interface with the other inner inductor segment 104 (e.g., first inductor segment 80) or an outer inductor segment 102 (e.g., a third inductor segment 122). For example, the second inductor segment 86 contacts the first inductor segment 80 along the first interface 120 between air bypass channels 46, and the second inductor segment 86 contacts the third inductor segment 122 along a second interface 123 across the gap 50. The second inductor segment 86 may be a mirror image of the first inductor segment 80 relative to the first interface 120, and/or the second inductor segment 86 may be a mirror image of the third inductor segment 122 relative to the second interface 123. That is, in some embodiments, the first inductor segment 80 and the third inductor segment 122 may have the same geometry. Accordingly, the inductor box 24 may have two types of mirrored inductor segments 44, such as right air bypass channels (e.g., first inductor segment 80, third inductor segment 122) and left air bypass channels (e.g., second inductor segment 86).

The inductor segments 44 may be arranged in channel pairs 124 so that the air bypass channel 46 of each inductor segment 44 is positioned adjacent to the inductor box wall 100 (e.g., outer inductor segments 102) or to another inductor segment 44 (e.g., inner inductor segments 104). The air bypass channels 46 of each of the channel pairs 124 form one structure across the agricultural product supply chamber 51 rather than separate structures. The gaps 50 are positioned between gap pairs 126 of inductor segments 44. This enables the gaps 50 to be wider than if each air bypass channel was separated from adjacent air bypass channels (e.g., evenly spaced along the length of the inductor box 24). Accordingly, for an inductor box 24 with N delivery ports 38 and N inductor segments 44, the inductor box 24 has N/2 gaps 50 and gap pairs 126, and N/2−1 channel pairs 124. For example, the inductor box 24 of FIG. 6 has eight inductor segments 44, four gaps 50, four gap pairs 126, and three channel pairs 124. A presently contemplated embodiment of the inductor box 24 with sixteen inductor segments 44 has eight gaps 50 and seven channel pairs 124.

Figure 7:
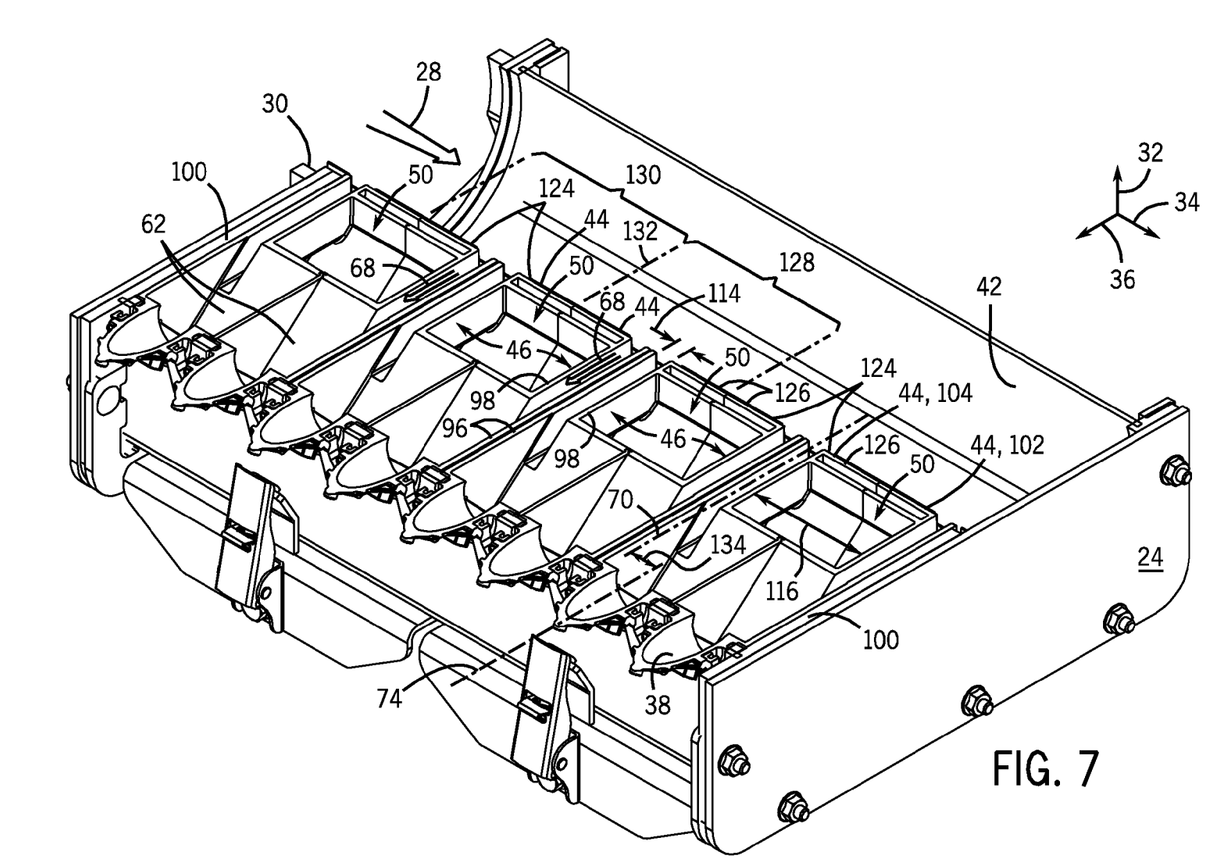
FIG. 7 is a cross-sectional view of an embodiment of the inductor box of FIG. 3, taken along line 7-7.

FIG. 7 is a cross-sectional view of an embodiment of the inductor box 24 of FIG. 3, taken along lines 7-7. The airflow 28 from the air supply chamber 42 is divided into bypass airflows 68 that pass through air bypass channels 46 to mixing chambers 62 of the inductor segments 44. Each air bypass channel 46 has a channel-width 114 between the first wall 96 and the second wall 98. The channel-width 114 is less than the gap-width 116 that enables the agricultural product to flow readily through the gap 50. In some embodiments, the gap-width 116 is between approximately 2 to 5 times the channel-width 114.

The inductor segments 44 may be arranged in pairs with a shared interface between the pairs. For example, a first pair 128 (e.g., channel pairs 124) may be a reflection of an adjacent second pair 130 (e.g., another channel pair 124) along a shared interface 132 between the first and second pairs 128, 130. In some embodiments, the inductor box 24 has multiple gap pairs 126 or channel pairs 124 with substantially similar geometries because each pair is a mirror image of the adjacent pair relative to the shared interface 132

The bypass axis 70 and the delivery port axis 74 extend along the Z-axis 36 and be substantially perpendicular to the X-axis 34. The air bypass channels 46 may not be centered relative to the mixing chambers 62 and delivery port axis 74. Accordingly, the delivery port axis 74 of each inductor segment 44 may be separated from the bypass axis 70 by an offset distance 134. Although the bypass airflows 68 from the air bypass channels 46 may not flow along bypass axes 70 collinearly with delivery port axes 74, each bypass airflow 68 may flow along a substantially equidistant flow path between the air supply chamber 42 and the delivery port 38.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural product delivery system, comprising:
   an inductor box comprising:
      an agricultural product inlet configured to receive agricultural product;
      an air inlet configured to receive an airflow;
      an inductor body configured to guide the agricultural product to a bed of the inductor box and to guide first portions of the airflow through the bed;
      a plurality of mixing chambers each configured to mix the agricultural product and a respective one of the first portions of the airflow; and
      a plurality of air bypass channels each configured to guide a respective second portion of the airflow from the air inlet to a respective mixing chamber of the plurality of mixing chambers, wherein the plurality of air bypass channels comprises:
         inside air bypass channels each in contact with an adjacent inside air bypass channel; and
         outside air bypass channels each arranged adjacent to an exterior inductor box wall.

2. The agricultural product delivery system of claim 1, wherein the agricultural product inlet is configured to receive agricultural product in a first direction, each air bypass channel of the plurality of air bypass channels is configured to guide the respective second portion of the airflow in a second direction, and the first direction is substantially perpendicular to the second direction.

3. The agricultural product delivery system of claim 1, wherein each of the inside air bypass channels is a mirror image of the adjacent inside air bypass channel relative to an interface with the adjacent inside air bypass channel.

4. The agricultural product delivery system of claim 1, wherein the inductor box comprises a plurality of inductor segments, each inductor segment of the plurality of inductor segments comprises one of the plurality of mixing chambers and one of the plurality of air bypass channels, and the inductor body comprises a portion of each inductor segment of the plurality of inductor segments.

5. The agricultural product delivery system of claim 4, wherein each inductor segment is a mirror image of an adjacent inductor segment relative to an interface with the adjacent inductor segment.

6. The agricultural product delivery system of claim 1, wherein a geometry of each air bypass channel comprises a D-shape, a C-shape, a semicircular shape, or any combination thereof.

7. An agricultural product delivery system, comprising:
   an inductor box comprising:
      an agricultural product inlet configured to receive agricultural product;
      an air inlet configured to receive an airflow;
      an inductor body configured to guide the agricultural product to a bed of the inductor box and to guide first portions of the airflow through the bed;
      a plurality of mixing chambers each configured to mix the agricultural product and a respective one of the first portions of the airflow; and
      a plurality of air bypass channels each configured to guide a respective second portion of the airflow from the air inlet to a respective mixing chamber of the plurality of mixing chambers, wherein the plurality of air bypass channels comprises:
         inside air bypass channels each in contact with an adjacent inside air bypass channel; and
         outside air bypass channels each arranged adjacent to an exterior inductor box wall, wherein each outside air bypass channel comprises an outer wall configured to contact the exterior inductor box wall and an inner wall spaced a channel-width from the outer wall, each inside air bypass channel comprises a first wall and a second wall spaced the channel-width from the first wall, and the first wall is configured to contact the first wall of an adjacent air bypass channel.

8. The agricultural product delivery system of claim 7, wherein a width of a gap between adjacent second walls is approximately 2 to 5 times the channel-width.

9. The agricultural product delivery system of claim 7, wherein the agricultural product inlet is configured to receive agricultural product in a first direction, each air bypass channel of the plurality of air bypass channels is configured to guide the respective second portion of the airflow in a second direction, and the first direction is substantially perpendicular to the second direction.

10. The agricultural product delivery system of claim 7, wherein each of the inside air bypass channels is a mirror image of the adjacent inside air bypass channel relative to an interface with the adjacent inside air bypass channel.

11. The agricultural product delivery system of claim 7, comprising a plurality of inductor segments, and each inductor segment of the plurality of inductor segments comprises one of the plurality of mixing chambers and one of the plurality of air bypass channels.

12. The agricultural product delivery system of claim 11, wherein each inductor segment is a mirror image of an adjacent inductor segment relative to an interface with the adjacent inductor segment.

13. The agricultural product delivery system of claim 12, wherein each inductor segment of the plurality of inductor segments comprises a delivery port coupled to the mixing chamber, the delivery port is arranged along a delivery axis, and the air bypass channel is arranged along a bypass axis laterally offset from the delivery axis.

14. The agricultural product delivery system of claim 7, wherein a geometry of each air bypass channel comprises a D-shape, a C-shape, a semicircular shape, or any combination thereof.

15. An inductor box for an agricultural product delivery system, comprising:
   an inductor box comprising:
      an agricultural product inlet configured to receive agricultural product;
      an air inlet configured to receive an airflow;
      an inductor body configured to guide the agricultural product to a bed of the inductor box and to guide first portions of the airflow through the bed;
      a plurality of mixing chambers each configured to mix the agricultural product and a respective one of the first portions of the airflow;
      a plurality of air bypass channels each configured to guide a respective second portion of the airflow from the air inlet to a respective mixing chamber of the plurality of mixing chambers, wherein the plurality of air bypass channels comprises:
         inside air bypass channels each in contact with an adjacent inside air bypass channel; and
         outside air bypass channels each arranged adjacent to an exterior inductor box wall; and
      a plurality of inductor segments, wherein each inductor segment of the plurality of inductor segments comprises one of the plurality of mixing chambers and one of the plurality of air bypass channels, each inductor segment is a mirror image of an adjacent inductor segment relative to an interface with the adjacent inductor segment, each inductor segment of the plurality of inductor segments comprises a delivery port coupled to the mixing chamber, the delivery port is arranged along a delivery axis, and the air bypass channel is arranged along a bypass axis laterally offset from the delivery axis.

16. The agricultural product delivery system of claim 15, wherein the agricultural product inlet is configured to receive agricultural product in a first direction, each air bypass channel of the plurality of air bypass channels is configured to guide the respective second portion of the airflow in a second direction, and the first direction is substantially perpendicular to the second direction.

17. The agricultural product delivery system of claim 15, wherein each of the inside air bypass channels is a mirror image of the adjacent inside air bypass channel relative to an interface with the adjacent inside air bypass channel.

18. The agricultural product delivery system of claim 15, wherein a geometry of each air bypass channel comprises a D-shape, a C-shape, a semicircular shape, or any combination thereof.

* * * * *